May 20, 1930.  R. C. OSGOOD  1,759,463
LUBRICATOR
Filed Oct. 1, 1921

Inventor:
Robert C. Osgood
by
Atty.

Patented May 20, 1930

1,759,463

UNITED STATES PATENT OFFICE

ROBERT C. OSGOOD, OF CLAREMONT, NEW HAMPSHIRE, ASSIGNOR TO SULLIVAN MACHINERY COMPANY, A CORPORATION OF MASSACHUSETTS

LUBRICATOR

Application filed October 1, 1921. Serial No. 504,800.

My invention relates to lubricators.

An object of my invention is to provide an improved lubricator. Another object of my invention is to provide an improved automatic lubricator. A further object of my invention is to provide an improved lubricator automatically operative to initiate and discontinue lubrication with the starting and stopping of the mechanism arranged to be lubricated thereby. A still further object of my invention is to provide an automatically controlled pressure fluid governed gravity feed lubricator. Other objects of my invention will hereinafter more fully appear.

In the accompanying drawings I have shown for purposes of illustration one form which my invention may assume in practice.

In these drawings,—

Figure 1:
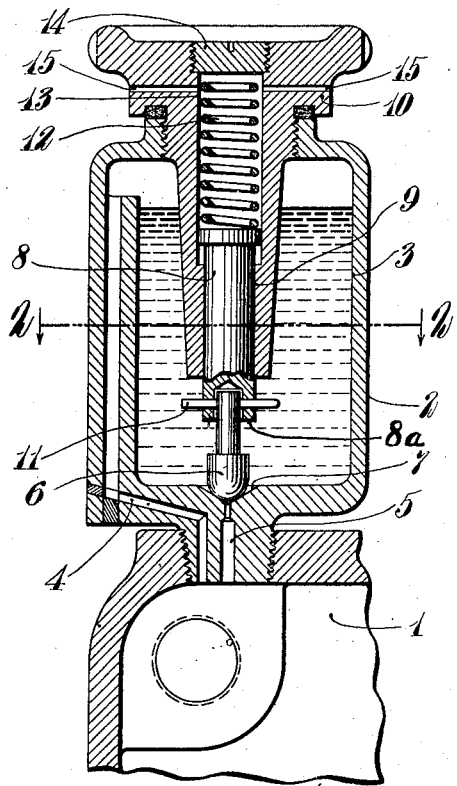
Fig. 1 is a central vertical section through the illustrative embodiment of my invention.
Figure 2:
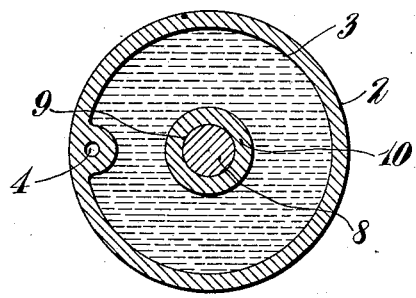
Fig. 2 is a transverse horizontal section on a plane corresponding to the line 2—2 of Fig. 1.

In this illustrative form of my invention I have disclosed an embodiment thereof adapted for connection to any passage to which pressure fluid is supplied during the operation of the mechanism to which the lubricator is adapted to supply lubricant. Such a passage is generally indicated at 1 in the accompanying drawings. Threaded into the top of this passage is a casing 2 having a lubricant storage chamber 3 within the same and communicating with said passage 1 by a continuously open passage 4 formed in a wall of the casing 2 and opening into the lubricant reservoir 3 adjacent its top. A second passage 5 extends between the interior of the casing 2 and the passage 1 and is controlled by a valve 6. The valve 6 is hemispherical at its lower extremity and is adapted to fit in a conical depression 7 forming the inlet to the passage 5.

For the purpose of automatically opening the valve 6 at such times as pressure is admitted to the passage 1 I have provided a piston 8 reciprocable in a bore 9 formed in a depending extension on the lubricant chamber closure member 10, the valve 6 being attached to the piston by suitable means, herein designated generally 11, which will permit it a limited lateral freedom of movement relative to its seat to insure an arcuate seating. A spring 12 is arranged in a chamber 13 constituting an enlargement of the bore 9 in which the piston 8 reciprocates and is maintained under pressure by a removable threaded member 14. It will be understood that the piston 8 is a ground fit for the cylinder 9, etc. and that accordingly there is substantially no leakage of lubricant past the piston. In order to vent the upper end of the chamber 13 laterally extending vent passages 15 are provided.

The mode of operation of this mechanism will be readily apparent. As soon as pressure is admitted to the chamber or passage 1 it passes by way of passage 4 to the upper end of lubricant receptacle 2 wherein it acts upon the surface of the lubricant. The pressure transmitted to the lubricant in accordance with well known physical laws is transmitted to the lower surface $8^a$ of the piston 8, and as the pressures acting on the valve 6 practically neutralize each other, the unbalanced liquid pressure on the piston 8 unseats the valves 6. It will be understood that the valve 6 will be maintained open as long as pressure is supplied to the chamber 1 and it will further be understood that the lubricant being subjected to equal pressures upon its upper and lower surfaces will drip gradually into the passage 5 and so into the passage way or chamber 1 and be carried by the rush of pressure or otherwise to the surfaces to be lubricated.

While I have in this application specifically described one form which my invention may assume in practice, it will be understood that this form of the same is shown for purposes of illustration and that the invention may be modified and embodied in various other forms without departing from its spirit or the scope of the appended claims.

What I claim as new and desire to secure by Letters Patent is:

1. In combination, a chamber containing pressure fluid under substantially constant pressure, and means for feeding lubricant into said chamber comprising a lubricant reservoir, a passage for establishing communication between said chamber and said reservoir to place the lubricant in said reservoir under normally constant pressure, an outlet for lubricant from said reservoir to said chamber, a valve for controlling said outlet, and means presenting an unbalanced area subjected to said normally constant pressure in said reservoir for automatically holding said valve open when pressure fluid is being supplied to said chamber.

2. In combination, a chamber through which pressure fluid may be supplied to a mechanism to be lubricated, and means for feeding lubricant into said chamber including a lubricant reservoir, a passage for establishing communication between said chamber and the top of said reservoir, an outlet for lubricant from said reservoir to said chamber, a valve in said reservoir for controlling said outlet, and means presenting an unbalanced area subjected to normally constant pressure in said reservoir for automatically moving said valve to open position and holding the same in such position constantly while pressure fluid is being supplied through said chamber to said mechanism.

3. In combination, a chamber in communication with a motive fluid supply passage, a lubricating device for feeding lubricant into said passage comprising a lubricant reservoir, means providing a passage for constantly placing said reservoir under the pressure of fluid in said supply passage, an outlet for lubricant from said reservoir to said chamber, a valve in said reservoir for controlling said outlet, and a pressure responsive device connected to said valve and having an unbalanced area subjected to the normally constant pressure in said reservoir, said device being disposed within said reservoir and automatically operable to hold said valve in open position constantly while motive fluid is being supplied through said first mentioned passage.

4. In combination, a chamber through which motive fluid may be supplied to a mechanism to be lubricated, a lubricating device for feeding lubricant into said chamber comprising a lubricant reservoir, means providing constant communication between said chamber and the top of said reservoir, an outlet for lubricant from said reservoir to said chamber, a valve in said reservoir for controlling said outlet, a piston connected to said valve and having only one side exposed to pressure in said reservoir, and a spring acting on said piston in opposition to the pressure in said reservoir and tending to hold said valve normally closed, said spring being designed to permit pressure in said reservoir to hold said valve open constantly while motive fluid is supplied through said chamber.

5. In combination, a chamber through which motive fluid may be supplied to a mechanism to be lubricated, a lubricating device for feeding lubricant into said passage comprising a lubricant reservoir, means providing a passage for establishing constant communication between said chamber and the top of said reservoir, an outlet for lubricant from said reservoir to said chamber, a guide within said reservoir, a plunger slidable in said guide and having one side exposed to the pressure in said reservoir and the other side exposed to atmospheric pressure, and a valve for controlling said outlet connected to said plunger whereby said valve is held constantly open by hydrostatic pressure in said reservoir when motive fluid is supplied through said chamber.

6. In a lubricating device, the construction as set forth in claim 5 wherein said guide comprises a boss depending into said reservoir and having a longitudinal bore therein.

In testimony whereof I affix my signature.

ROBERT C. OSGOOD.